Dec. 27, 1932.  E. M. SIMONDS  1,892,169

APPARATUS FOR COOKING FOOD

Filed Aug. 13, 1928  4 Sheets-Sheet 1

Inventor
Edmond M. Simonds
By Attys.

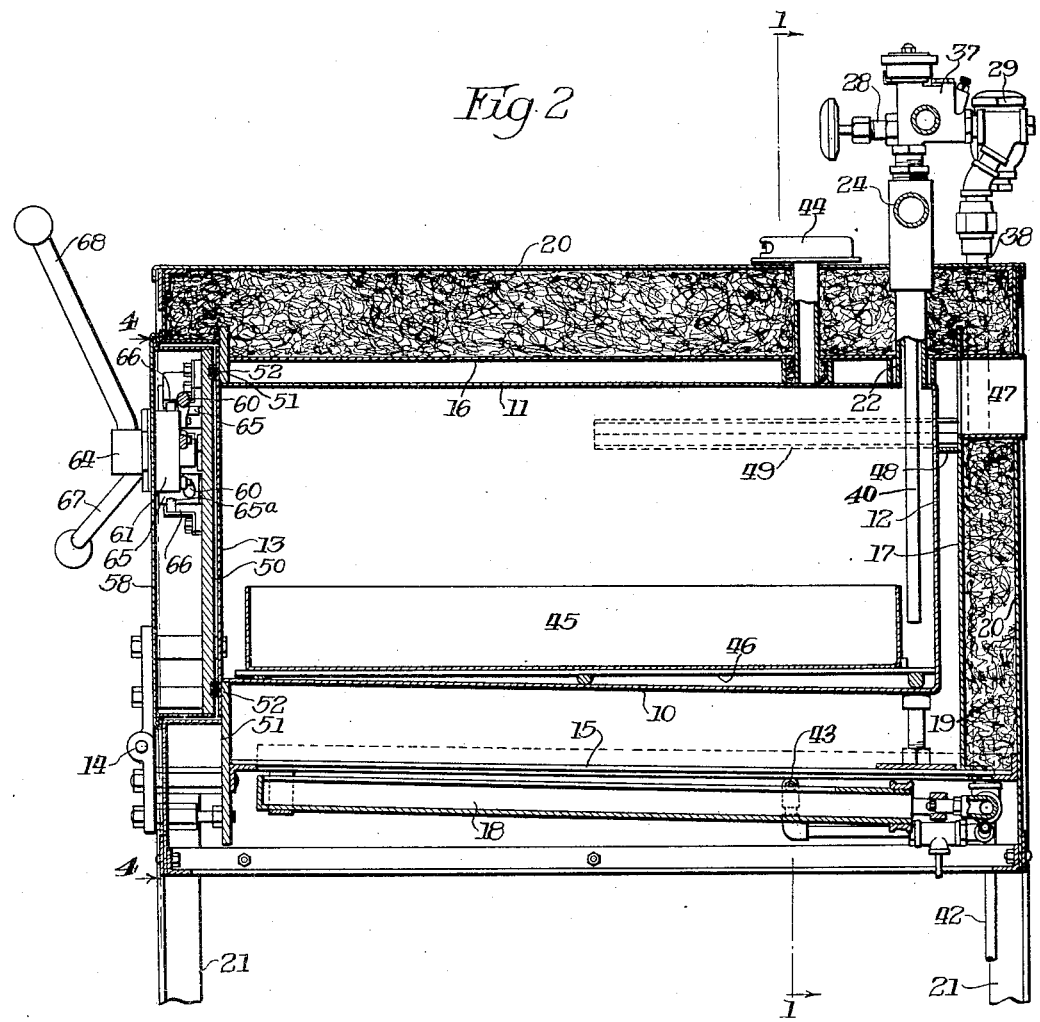

Dec. 27, 1932.  E. M. SIMONDS  1,892,169
APPARATUS FOR COOKING FOOD
Filed Aug. 13, 1928   4 Sheets-Sheet 3

Inventor:
Edmond M. Simonds.
By Cromwell, Greitweiser
Attys.

Dec. 27, 1932.  E. M. SIMONDS  1,892,169
APPARATUS FOR COOKING FOOD
Filed Aug. 13, 1928   4 Sheets-Sheet 4
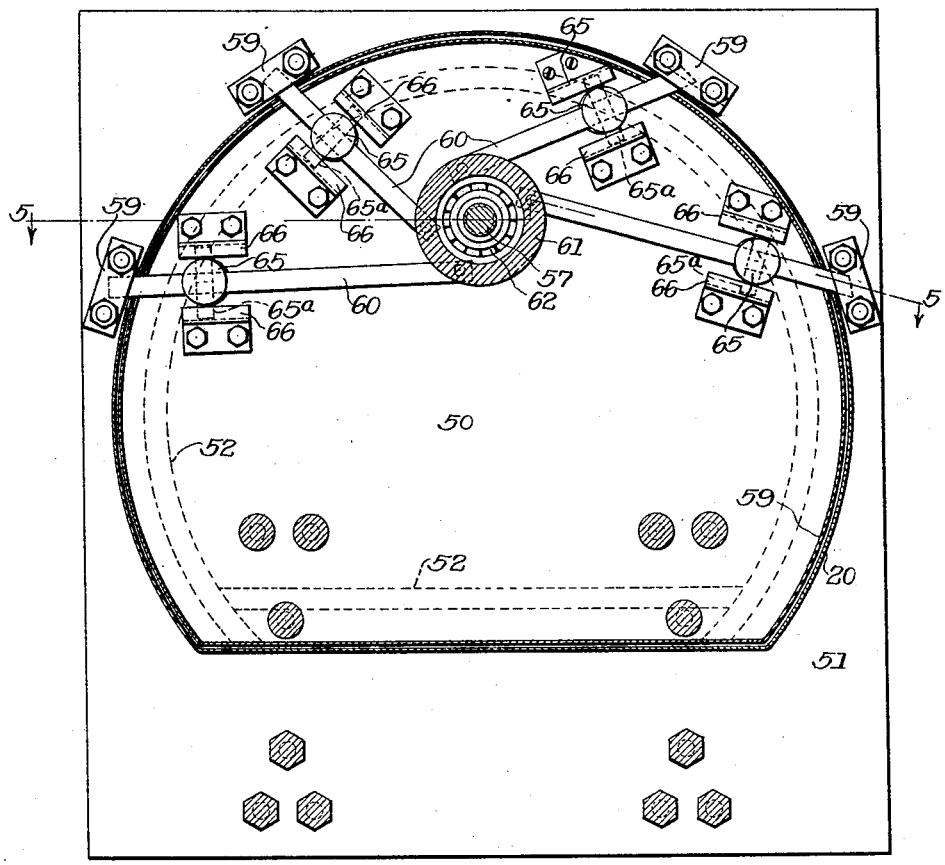
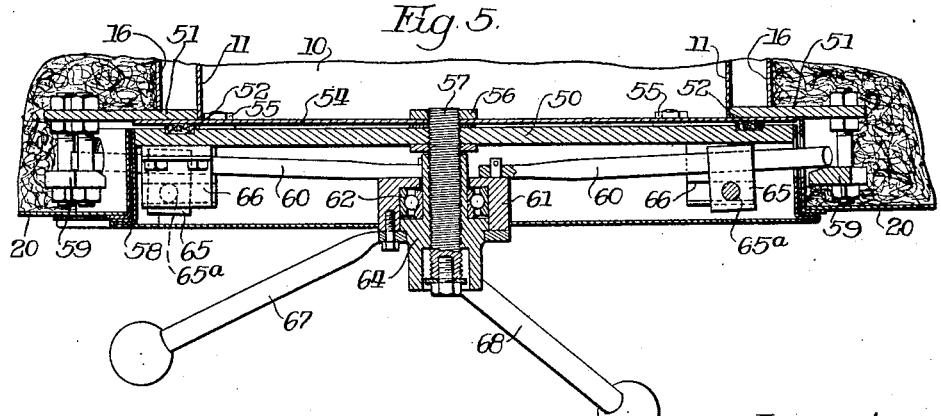
Inventor:
Edmond M. Simonds
By Cromwell, Westwood Attys.

Patented Dec. 27, 1932

1,892,169

UNITED STATES PATENT OFFICE

EDMOND M. SIMONDS, OF WILMETTE, ILLINOIS

APPARATUS FOR COOKING FOOD

Application filed August 13, 1928. Serial No. 299,376.

This invention relates to apparatus for the cooking of food.

The general object of the invention is the provision of apparatus which may be employed conveniently in cooking, with material reduction in the duration of the length of time required for the cooking of various foods, improvement in the quality and palatability of the food, elimination of loss from shrinkage and over-cooking, reduction of fuel consumption and reduction of the labor and attention required from the cook.

More specifically stated, one of the objects is the provision of apparatus whereby food may be cooked, particularly in quantities, with a desired uniformity as between different portions of the piece and with the cooking procedure controlled in an automatic fashion such as to attain uniformity of results and decrease the amount of supervision necessary during the cooking.

Yet another object is the provision of an improved construction for cooking apparatus whereby uniform distribution of heat upon the charge is obtained.

Another object is the provision of an improved governing apparatus for controlling the application of heat in the cooking operation.

A further object is the provision of improvements in the construction of a cooking apparatus which will facilitate the charging and discharging of the cooking chamber and the tight closing of the same to retain superatmospheric pressure therein.

Still another object is the provision of cooking apparatus having improved features of construction which facilitate and contribute to its remaining in a sanitary and unfouled condition.

Another object is the provision of cooking apparatus having the attributes specified above and which, while having a desirably large capacity, will require minimum space and can be conveniently installed and associated with other kitchen fixtures.

Other and further objects will be pointed out or indicated hereinafter, or will become apparent upon an understanding of the invention or its employment in practice.

In the drawings forming a part of this specification I illustrate one construction wherein the invention may be embodied and practiced, but it is to be understood that this and the several features shown are presented for purpose of illustration only and are not to be construed as imposing on the claims any limitations short of the true and more comprehensive scope of the invention in the art.

In said drawings

Fig. 1 is a transverse sectional elevation of an oven or cooking apparatus, showing certain of the control mechanism in elevation;

Fig. 1$^a$ is a top view of a portion of the control mechanism and fuel connections;

Fig. 2 is a longitudinal sectional elevation of the apparatus on substantially line 2—2 of Fig. 1;

Fig. 4 is a detail of the door in the nature of a section on substantially line 4—4 of Fig. 2; and Fig. 5 is a section of the same on substantially line 5—5 of Fig. 4.

Figure 1:
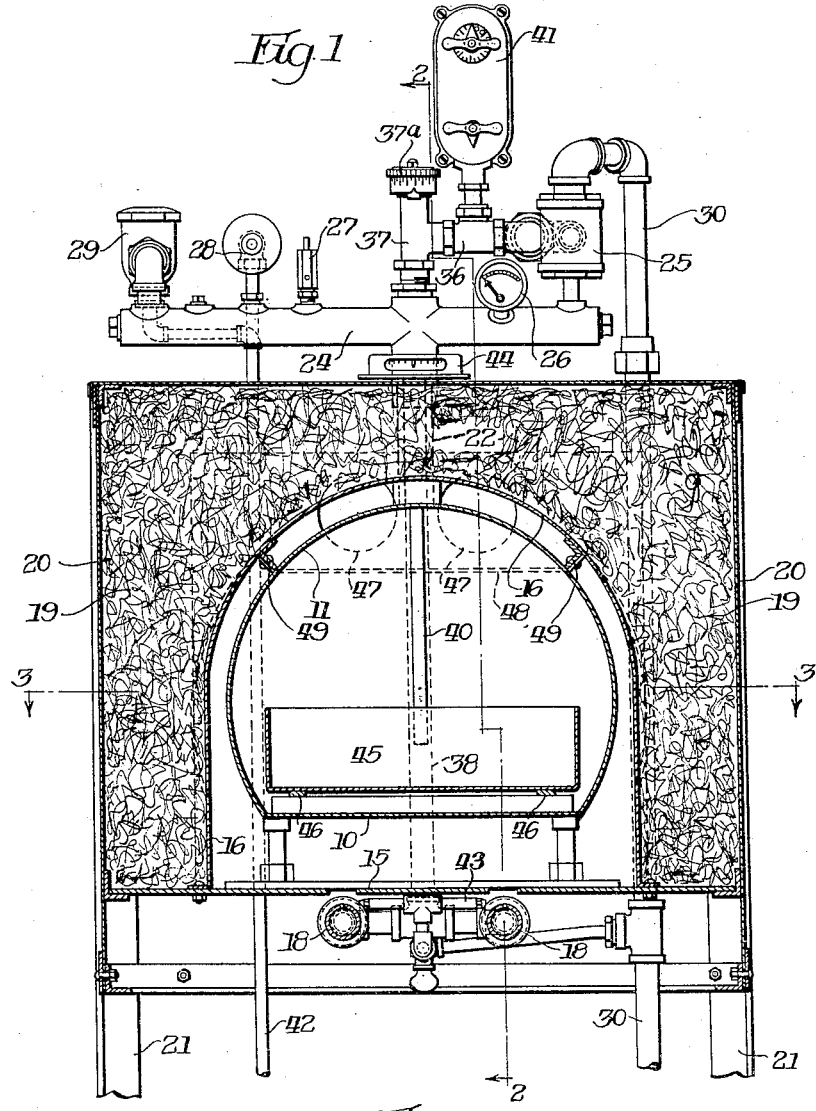
Figure 1A:
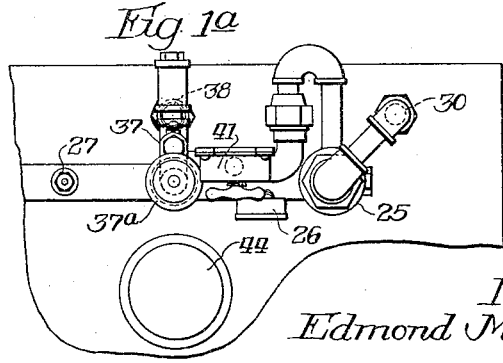

As generally employed in the culinary art, the terms "baking" and "roasting" are used to designate a cooking procedure wherein the article of food is subjected to heat while exposed in air. The effect of such treatment on the food is to cook exterior portions to a considerably greater extent than internal portions, and this effect is accompanied by a considerable extraction of moisture from the food, particularly the surface portions, by evaporation. The application of too great heat in such procedure is likely to over-cook surface portions of the article before internal portions are cooked to the desired degree. This is particularly true in the cooking of large pieces, such as roasts of meat, hams, etc.

The term "boiling" is customarily applied to a treatment wherein the article of food is immersed in water, and the heat applied through the latter. This treatment is usually accompanied by the loss or extraction of a considerable quantity of the juices and flavor-imparting constituents of the food, including mineral salts and soluble albumens, and dilution of those retained with water absorbed by the food.

Both of these usual methods of cooking have rather definite limitations as to the amount of heat which can be applied to the food in a given time, and with the procedures and types of apparatus heretofore employed it has proved impossible or impracticable to effect any substantial reduction in the cooking time without impairment of the quality of the food or loss through excessive shrinkage or overcooking of parts.

The present invention provides an apparatus whereby the cooking time required for a given article, for example a roast of meat, may be very materially reduced, without injury to the food or impairment of its quality or material increase of its shrink, but, on the contrary, with pronounced betterment of its gustatory and nutritive values. The apparatus affords a cooker which may be automatically controlled to obtain the desired cooking results and is susceptible of a diversity of uses such as to obtain the effects of boiling, roasting and frying, with the betterments mentioned above. The nature of the invention may be most quickly ascertained from an understanding of the illustrative embodiment shown in the drawings which will now be described.

Figure 3:
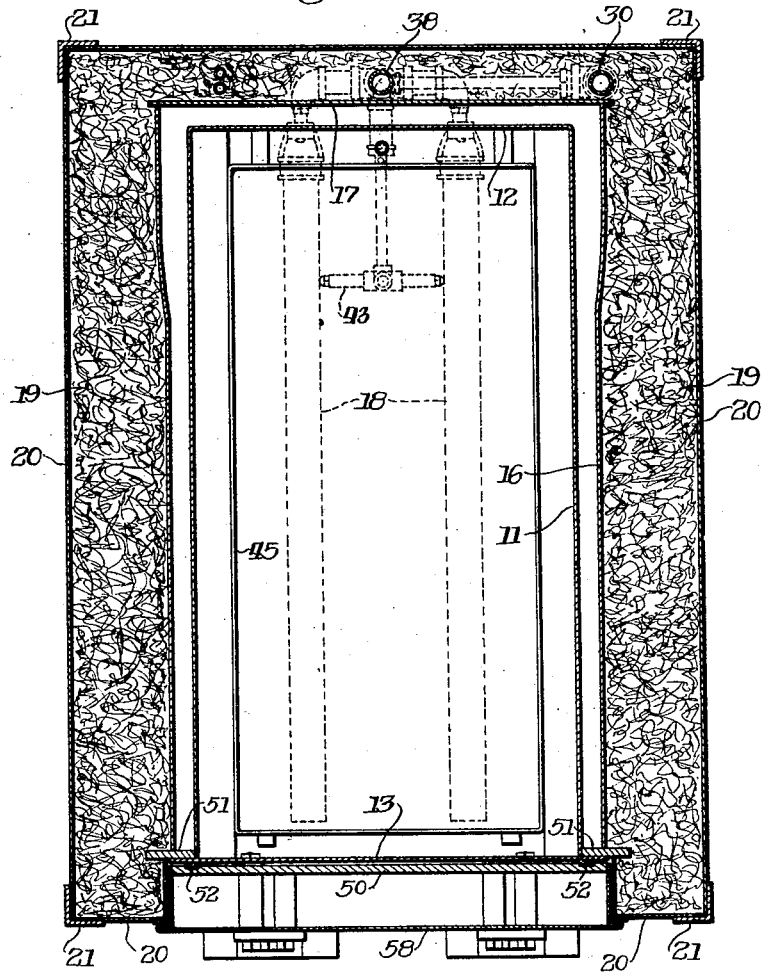
Fig. 3 is a horizontal section on substantially line 3—3 of Fig. 1.

The cooking receptacle, as here shown, is preferably made of thin metal having efficient heat-absorbing and heat-radiating characteristics, such as dark colored sheet iron, and is formed with a flat bottom portion 10 and an arched wall portion 11 of substantially cylindrical contour. It is closed at its rear end by a rear wall 12, and is open at its front end, where it is equipped with a swinging door 13 hinged at 14, which may be clamped in position to tightly close the open end, as illustrated in Figs. 2 and 3. The chamber of this cooking receptacle is preferably of greater height at its rear end than at its front end, so that the bottom 10 slopes rearwardly, as seen in Fig. 2. The cooking receptacle is housed within a heating chamber which has the slotted bottom 15, spaced from the bottom of the cooking receptacle, and the side and top wall portions 16 spaced from the wall portions of the cooking receptacle and conforming generally to the contour thereof, and likewise a rear wall 17 spaced from the end wall 12 of the receptacle. Burners 18 are arranged below the bottom of the heating chamber so as to discharge their flame jets through the slots in the bottom of the latter and into the heating chamber below the cooking receptacle without the flame impinging the latter. The interior walls of the heating chamber may be formed of metal having the inner surface highly polished or provided with a reflecting coating, and are covered exteriorly over their sides and top with heat-insulating material 19 which is inclosed by a casing 20. The whole apparatus may be supported on legs 21.

A tube 22 leads from the upper portion of the cooking chamber to a header 24, and on this header and in communication therewith, are a pressure-operated valve 25, a pressure indicator 26, pressure limit valve 27, venting valve 28 and air-relief valve 29. The fuel, which may be gas, is supplied through a pipe 30 and passes first through the pressure operated valve 25, thence through a time-controlled valve 36, thence through a temperature-controlled valve 37, and thence through a pipe 38 to the burner 18. A pilot burner 43 is supplied independently from the gas line 30 ahead of the valves just mentioned. The temperature-controlled valve 37 is operated by a thermostat 40 which is positioned within the cooking receptacle, and said valve has a hand adjustment 37a whereby the opening and closing effect of the thermostat on the valve may be varied in relation to the temperature range. The time-controlled valve 36 is arranged to be opened by hand and to close automatically on release by a time controlled device 41. The opening and closing of pressure-operated valve 25 to control the flow of gas therethrough is responsive to variations of pressure within the cooking receptacle. The pressure-limit valve 27 is simply a safety device which opens automatically to relieve pressure from the cooking receptacle upon its attaining some predetermined maximum value. The trickle or venting valve 28, as shown in Figs. 1 and 2, is intended for operation by hand and is capable of very small adjustments to control venting of pressure from the cooking receptacle. Air relief valve 29 is responsive to temperature of steam passing therethrough from the header 24 and operates automatically to permit the venting of air from the cooking receptacle when the device is started in operation and to close automatically when steam of the desired minimum temperature begins to pass. Steam or air vented through valves 28 and 29 is discharged to a sewer or chimney through a suitable connection 42. An indicating thermometer 44 is arranged to show approximately the temperature prevailing at the center of the cooking receptacle.

The food is placed in a suitable pan 45 which is supported out of contact with the bottom and walls of the cooking receptacle, as on a support 46. Preferably the area of this pan is such as to almost entirely cover the bottom of the cooking receptacle, and if uniform cooking of bottom as well as upper surface portions of the food is desired, the pan should be of material having efficient heat-absorbing and radiating characteristics.

When the burner is operating, the hot combustion gases from the burner completely envelop the bottom and walls of the cooking receptacle, their flow upwardly from the combustion zone being facilitated by the gradually upwardly contracting form of the lower side portions of the heating chamber. Thus a continual flow of the heating medium is maintained in intimate contact with the bottom and walls of the cooking receptacle, the gases finally passing out through the openings 47 to a chimney. The combustion gases heat the bottom and walls of the cooking receptacle, and the shape of the wall of the cooking receptacle is such as to direct the heat radiated therefrom toward the location of the food, and the application of heat to the exterior of the cooking receptacle is so controlled and distributed as to produce an approximately uniform distribution of the radiant heat over the area occupied by the food. The desired distribution of the heat applied to the cooking receptacle is effected by control of the flow of the hot gases in contact with its outer surfaces. One factor in the control of the flow of the hot gases is the directing of their course by the baffles 48 and 49. The baffle 48 is disposed below the flue openings 47, closing the heating chamber therebelow, so that the gases cannot pass directly upon along the rear end wall of the cooking receptacle to those openings but must take a forward path along the sides of the cooking receptacle below the baffles 49. Thus the hot gases are required to move toward the front end of the heating receptacle, thereby maintaining the forward portion of its walls at a somewhat higher temperature than the rear portions, to counterbalance the heating effect of the rear wall 12, for which there is no counterpart externally heated element at the front. From the forward ends of the baffles 49 the gases pass rearwardly over the top of the cooking receptacle to the outlet openings 47. Another factor in the control of the wall temperatures is the width of the flow space afforded between the wall of the cooking receptacle and the adjacent wall portion of the heating chamber 16. By making this flow space narrower at a given location than it is at another, the gases will be caused to pass more swiftly through the narrower portion and thus impart more heat to the cooking receptacle wall in the areas over which the flow space is narrow than in those over which it is wider. For illustration, as seen in Fig. 3, the flow space between the walls 11 and 16 is wider at the rearward end of the cooking receptacle than at the forward portion, and as a consequence, with the gases at the same temperature, more heat will be imparted to each unit of area of the receptacle wall 11 in the forward portion than in the portion where the surrounding flow space is wider. This provision is made in the construction shown in Fig. 3 in order to attain the desired equalization of radiant heat effect on food in the front and rear portions of the cooking chamber.

The construction of the door is illustrated in Figs. 4 and 5. It comprises the stiff plate 50 which is hinged at 14 to a rigid plate 51 and is of sufficient area to cover the end opening of the cooking receptacle. On its inner side it carries a continuous gasket 52 of slightly compressible elastic material, adapted to withstand heat, such as compressed asbestos, and a sealing plate 54 of flexible metal, such as sheet iron, of substantially the same area as the plate 50. This sealing plate 54 rests upon the gasket 52 and is adapted to make contact with the plate 51 around the end opening of the cooking receptacle. The sealing plate is held in place by screws 55 seated in the plate 50 and by the nut 56 on the inner end of a screw post 57 which is stationarily mounted in the plate 50. The casing 20 is shaped to afford a cavity for reception of the door, and the latter has a sheet metal casing portion 58 attached to the margin of the plate 50 and of such depth as to be approximately flush with the front of the housing 20 when the door is closed, the outer wall of said casing housing marginal flanges adapted to overlap the housing 20 around the door opening. The plate 51 is tightly joined to the front margins of the cooking receptacle and the heating chamber walls 16 so as to seal the front end of the heating chamber. It also carries the keepers 59 for the door clamping bolts. The door securing mechanism includes the clamping bolts 60 which have pivotal connection at one end with a collar 61 which is carried on a bearing 62 so as to be rotatable about the post 57. This bearing is supported by a sleeved nut 64 which is screw threaded on the post 57. The clamping bolts are fulcrumed toward their outer ends by swivel members 65 which have trunnions 65$^a$ supported for rocking and sliding movement in supporting guides 66 bolted to the plate 50. The keepers 59 have their inner margins disposed adjacent the periphery of the door opening and somewhat bevelled as seen in Fig. 5, in locations where the clamping bolts 60 may be engaged behind them, as illustrated in Fig. 4. Such engagement of the bolts 60 with the keepers is effected by rotating the collar 61 in a clockwise direction when the door is closed, the collar being provided with a handle 67 for that purpose. The bolts may be retracted from the position shown in Fig. 4 by rotating the collar in counter-clockwise direction, the trunnions of the swivel members 65 sliding on the guides 66 as the bolts are shifted in either direction. This operation of bolts 60 by the collar 61, either to project them or to retract them, is effected when the sleeve nut 64 is in a position toward the outer end of the post 57 as compared with the position in which it is shown in Fig. 5. This sleeve nut 64 is equipped with a handle 68 whereby it may be rotated on the post 57 to turn it up toward the plate 50 or back it off therefrom. Such operation of the sleeve nut changes the angularity of the bolts 60 with respect to the plate 50, such movement being accommodated by their pivotal connection with the collar 61 and the rocking connection of the swivel members 65 with the guides 66. When it is desired to clamp the door in the desired position, therefore, the sleeve nut 64 being in the position toward the outer end of the post 57, the collar 61 is rotated in the clockwise direction to engage the ends of the bolts 60 behind the bevelled portions of the keepers 59. The sleeve nut 64 then being turned up on the post 57, the inner ends of the clamping rods 60 are carried toward the plate 50, thus projecting their outer ends further under the keepers 59, and at the same time causing them to exert a leverage against the keepers, which leverage is transmitted to the plate 50 through the swivel members 65 and guides 66, with the result that the door is forcibly pressed against the plate 51. The flexible plate 54 and elastic gasket 52 permit the plate to make close contact with the plate 51 at all points, so that a tight seal is effected completely around the opening of the cooking receptacle. Since both the outward pressure from the bolts 60 and hinge 14 and the inward pressure from the door are exerted against the rigid plate 51, the relatively thin metal of the cooking receptacle and the joints between same and said plate are entirely relieved of any pressure from the door.

In the operation of this apparatus, the food to be cooked, for example a roast of meat, is placed in the pan 45 and the pan is positioned on the support 46 within the cooking chamber. A suitable quantity of water is placed in the cooking chamber, either as a constituent of the article to be cooked, or on the bottom of the cooking chamber, or in the pan. The door is then closed to seal the cooking chamber. The air relief valve 29, however, is open, as its actuating element is cold, and the pressure-operated gas control valve 25 is also open, as there is no pressure in the cooking chamber, and the temperature-controlled valve 37 is likewise open, as its thermostat is cold. Consequently, by opening the time-controlled valve 36 by hand, gas is admitted to the burner and ignited from the pilot 43. The hot combustion gases from the burner flame pass up in intimate contact with the bottom and walls of the cooking receptacle, so that the contents thereof are heated. Incident to this heating, steam is generated from the moisture within the cooking chamber. The air relief valve 29 remains open to permit the air to be displaced from the cooking chamber. At the start, the cooking chamber is full of air, and as this air becomes heated it expands. The steam generated in contact with this air is relatively heavy. Consequently as the generation of steam proceeds, the air is gradually displaced thereby through valve 29 until the cooking chamber is filled with steam. When steam of a certain temperature begins to pass through said valve, it closes automatically. With the closing of valve 29, the cooking chamber is completely sealed, so that pressure may be built up by the steam generated therein. The continued application of heat to the cooking receptacle raises its temperature to a desired degree above that of the contained steam, with the result that any free moisture in the inclosed atmosphere is converted into steam, and that atmosphere is rendered efficiently diathermanous. As the pressure in the cooking chamber approaches the limit for which the pressure operated valve 25 is set, this valve is given a closing movement tending to reduce the supply of gas to the burner, and upon the predetermined critical pressure being reached, said valve completely cuts off the supply of gas to the burner. If the application of heat is controlled entirely by the valve 25, the temperature within the cooking chamber would be definitely limited by the steam pressure. In order to apply a degree of heat as much as desired in excess of that corresponding to the critical pressure which would be effective to close the valve 25, the steam pressure may be prevented from reaching said critical value, this being accomplished by venting of pressure from the cooking chamber through the venting or trickle valve 28. To accomplish this, the valve 28 may be set to allow a small trickle or venting of steam from the cooking chamber, and thereby the valve 25 is maintained open to a commensurate degree, so that the burner remains in operation and the application of heat to the cooking receptacle is continued. Consequently, heat at a desired temperature in excess of that of the inclosed atmosphere is projected by radiation from the walls of the cooking receptacle through said atmosphere and onto and into the food. Thus the food is simultaneously subjected to the influence of the hot atmosphere under pressure and to the radiant heat from the receptacle walls. Likewise, if it is desired to limit the effective temperature in the cooking chamber to a value below that corresponding to the steam pressure which would close the valve 25, the operating connection of valve 37 may be set so that said valve will be closed by its thermostat at the desired temperature, thus cutting off or reducing the gas supply before the pressure in the cooking chamber attains a value sufficient to actuate valve 25. As pointed out above, by the form of the cooking receptacle walls and the distribution of the heat applied to them, a uniform distribution of the radiant heat upon the food is obtained. The pan 45, if formed of an efficient heat-transmitting and radiating material, functions as an intermediate heat-radiating surface and so does not prevent the desired uniform distribution of the radiant heat upon the food. The temperature-controlled valve 37, being set for the maximum temperature desired, reduces the supply of gas to the burner as that maximum temperature is approached, and completely cuts off the gas when the maximum temperature is attained. The time-controlled device 41 releases the self-closing valve 36 at the end of the period for which the timing mechanism is set, and thereby the supply of gas to the burner is completely cut off irrespective of the position of the pressure-controlled gas valve 25 and temperature controlled gas valve 37. This may take place before the end of the actual cooking period, and the completion of the cooking may be accomplished by the heat remaining in the cooking receptacle and the heating chamber. When this practice is followed, the trickle valve 28 is closed when the application of heat from the burner is stopped. At the end of the cooking period, the cooking chamber is vented to relieve the pressure, and the door then opened and the food removed. The venting may take place when the door is relieved of the clamping leverage of the bolts 60 as the nut 64 is backed off, the pressure escaping before the bolts are retracted to fully free the door. The marginal flange of the door casing 58 deflects the escaping steam so that it is not discharged onto the operator.

During the process of cooking as above described, the inclosed atmosphere of steam remains in a substantially saturated condition due to the fact that it is always in contact with the moisture in the cooking chamber, and hence is effective to prevent excessive evaporation of moisture from the food. If the moisture is in the form of excess water in the pan, its conversion into steam, and hence the building up of the pressure, will not be so rapid as it will be if the water is placed in the bottom of the cooking receptacle. Consequently, under the first-mentioned condition, the walls of the cooking receptacle, and the resulting heat transmitted to the food by radiation, will attain a higher value before the pressure-operated valve 25 comes into action, than will be the case when the steam pressure is more rapidly built up by the more rapid evaporation which occurs when the water is on the bottom of the cooking receptacle. The sloping form of the said bottom gives the water thereon at all times a thin film edge from which the steam is generated freely and rapidly. The arrangement of the pan to almost entirely cover the bottom of the cooking receptacle, and the shaping of the lower portion of the cooking receptacle walls so that the lines normal thereto are directed upwardly or away from the bottom, are designed to minimize the heating of water on the bottom of the receptacle by the radiant heat, and thereby render the generation of steam from such water and the resulting pressure within the receptacle, susceptible of more definite regulation and control, and prevent too rapid generation of steam when high wall temperatures are used.

Of course, when the food itself contains a sufficient amount of excess moisture to permit the generation of the requisite quantity of steam without excessive drying of the food, it is unnecessary to place additional water in the cooking receptacle. Under such conditions the temperature regulation remains under control of the pressure-controlled valve 25, with the temperature controlled valve 37 acting as a maximum limit valve and the cooking may be carried on with or without venting of pressure from the receptacle.

From the foregoing it will be apparent that the primary regulation of the cooking heat is accomplished by the pressure-controlled valve 25 and is in relationship to the pressure within the cooking receptacle. Accordingly, if it is desired to attain a highly heated condition of the cooking receptacle walls and the accompanying high degree of radiant heat on the food before the valve 25 is operated to reduce the application of heat, the water will be placed in the pan, or the moisture contained in the food will be relied on for generation of steam, if its moisture content is sufficient. On the other hand, if it is desired to reduce the application of heat before such a high radiant temperature is attained, the water will be placed in the bottom of the cooking receptacle.

The secondary regulation of the cooking temperature is accomplished through the medium of the temperature-controlled valve 37 in conjunction with the controlled venting of pressure as by trickle valve 28, and this secondary regulation is brought into operation when the degree of radiant heat desired is in excess of that which may be attained under the automatic control of pressure-operated valve 25 alone. The venting, in effect, changes the relationship of heat and pressure which is the basis of the regulation by valve 25, so that the cooking temperature attainable before valve 25 closes may be considerably higher than it is when no venting is taking place. The temperature-controlled valve 37, in conjunction with the rate at which pressure is vented, establishes the maximum limit of the cooking temperature, and the pressure-controlled valve 25 comes into play only as such limit is approached. In the event the pressure, under the increased application of heat, builds up so rapidly that the pressure-operated valve 25 comes into operation before the desired maximum temperature is approached, the regulating situation may be appropriately adjusted by increasing the venting.

By appropriate operation, therefore, cooking results comparable to baking or roasting may be obtained without the excessive drying or over-cooking of surface portions of the food, and cooking effects comparable to boiling may be obtained, but without the loss or dilution of flavoring constituents of the food, discoloration, or structural disintegration; and in the obtaining of said respective results, the cooking heat is applied to the food by radiation and by the enclosed saturated atmosphere in such fashion that the cooking period for the particular article may be very materially reduced from that required in usual practice, and desirable qualities of the food conserved.

In addition to use for the practice of the method above described, the apparatus may be otherwise employed in quite a variety of ways. It may be employed as a fireless cooker, if very slow cooking is desired, by heating it up and then completely cutting off the gas and permitting the food to remain within it subject to the contained heat. Or, it may be operated to obtain the cooking result commonly known as frying, by operating with or without pressure and with high temperature. Differences in cooking effects may also be obtained by using appropriate pans. Thus, by using a bright pan, parts of the foods shielded thereby from the radiant heat will not be cooked to the extent of those which are exposed to the direct radiation of heat from the walls of the cooking receptacle.

The apparatus is not to be confused with the familiar pressure cookers or steamers wherein the cooking is done under pressure with supersaturated steam, or with such devices wherein condensation of moisture from the steam is permitted to take place in the presence of the food during the cooking.

What I claim is:

1. In a cooking apparatus, in combination, a cooking receptacle adapted to confine steam under pressure, a heat-confining casing enclosing same, heating means for supplying heat to said receptacle, a header arranged externally of the casing and in communication with said receptacle, a regulating device for the heating means responsive to pressure in the header, and selectively operable means for venting pressure from the header.

2. In a cooking apparatus, in combination, a cooking receptacle adapted to confine steam under pressure, a heat-confining casing enclosing same, a header having communicating connection with the receptacle, heating means for applying heat to the receptacle, a pressure-responsive regulating device mounted on and in communication with the header, a thermo-responsive regulating device mounted on the header and communicating with the interior of the receptacle through said connection, said regulating devices arranged to govern operation of the heating means.

3. In a cooking apparatus, in combination, a cooking receptacle adapted to confine steam under pressure, said cooking receptacle formed of a material having efficient heat-absorbing and heat-radiating characteristics, a heat confining casing housing said cooking receptacle and having its internal wall spaced from the walls of said receptacle to afford an intervening chamber for flow of gases in contact with the walls of the receptacle, heating means disposed below the cooking receptacle for supplying hot gases to said chamber, a header arranged externally of the casing and having communication with the cooking receptacle through a steam-tight connection, an adjustable thermostat mounted on the header and having a heat-responsive portion extending through said connection and into the cooking receptacle, a pressure relief valve mounted on the header and subject to the steam pressure within the cooking receptacle, and means operable by the thermostat to control operation of the heating means.

4. In a cooking apparatus, in combination, a cooking receptacle adapted to confine steam under pressure, said cooking receptacle made of material having efficient heat-absorbing and heat-radiating characteristics, a heat confining casing housing said receptacle and having its inner walls spaced from said receptacle to afford an intervening chamber for flow of gases in contact with the receptacle walls, a burner arranged below the cooking receptacle to supply heat to said chamber, a header arranged externally of the casing and having communication with the cooking receptacle through a steam-tight connection, a thermostat mounted on said header and having a heat-responsive element exposed to radiant heat within the cooking receptacle, a pressure relief valve mounted on the header and subject to the pressure of steam within the cooking receptacle, and means under control of the thermostat for varying the supply of fuel to the burner.

In witness whereof I have hereunto subscribed my name.

EDMOND M. SIMONDS.